(12) United States Patent
Scholl et al.

(10) Patent No.: US 10,885,413 B1
(45) Date of Patent: Jan. 5, 2021

(54) COLOR HOLOGRAPHIC QUICK RESPONSE (CHQR) CODE FOR COUNTERFEIT AVOIDANCE

(71) Applicant: HNU Photonics LLC, Kahului, HI (US)

(72) Inventors: James F. Scholl, Tucson, AZ (US); Riley Aumiller, Kihei, HI (US); Daniel G. O'Connell, Kihei, HI (US); William Goodman, Albuquerque, NM (US)

(73) Assignee: HNU Photonics LLC, Kahului, HI (US)

( * ) Notice: Subject to any disclaimer, the term of this patent is extended or adjusted under 35 U.S.C. 154(b) by 0 days.

(21) Appl. No.: 16/359,416

(22) Filed: Mar. 20, 2019

Related U.S. Application Data (60) Provisional application No. 62/645,318, filed on Mar. 20, 2018, provisional application No. 62/740,590, filed on Oct. 3, 2018.

(51) Int. Cl.
   *G06K 19/06* (2006.01)

(52) U.S. Cl.
   CPC ... *G06K 19/06037* (2013.01); *G06K 19/0614* (2013.01); *G06K 19/06065* (2013.01)

(58) Field of Classification Search
   None
   See application file for complete search history.

(56) References Cited

U.S. PATENT DOCUMENTS

| | | | | |
|---|---|---|---|---|
| 2007/0138286 A1* | 6/2007 | Kamijoh | ............ | G06K 7/14 235/462.04 |
| 2011/0233284 A1* | 9/2011 | Howard | ............ | G06K 19/06037 235/494 |
| 2015/0134552 A1* | 5/2015 | Engels | ............ | G06Q 10/087 705/318 |
| 2017/0243097 A1* | 8/2017 | Loy | ............ | G06K 19/0614 |

FOREIGN PATENT DOCUMENTS

CN 108182654 A * 6/2018

OTHER PUBLICATIONS

Divya P.S. et al., "Security with Holographic Barcodes Using Computer Generated Holograms", 2013 International Conference on Control Communication and Computing (ICCC), IEEE, Dec. 13, 2013, pp. 162-166.
Nurwono, Kris Antoni Hadiputra, "Color Quick Response Code for Mobile Content Distribution", Advances in Mobile Computing and Multimedia, Dec. 14, 2009, pp. 267-271.
Prakash Divua et al., "Implemention of Digital Hologram Using Different Wavelengths & Color Quick Response Codes for High Profile Security Application", International Journal of Applied Engineering Research vol. 10, No. 2, 2015, pp. 3311-3320.
Taveerad Nutchanad, "Development of Color QR Code for Increasing Capacity", 2015 11th International Conference on Signal-Image Technology & Internet-Based Sysstems (SITIS), IEEE, Nov. 23, 2015, pp. 645-648.

* cited by examiner

*Primary Examiner* — Kristy A Haupt
(74) *Attorney, Agent, or Firm* — James Creighton Wray (57) ABSTRACT

New identifying code for labeling products to certify sources has Color Holographic Quick Response code by superim-
(Continued)

posing multiple layers of red, green and blue quick response codes using holographic imaging and creating layers of features that are extremely difficult to replicate. Multidimensional quick response code is provided in a hologram that cannot be copied.

17 Claims, 4 Drawing Sheets

Alphanumeric character codes

| Code | Character | Code | Character | Code | Character | Code | Character | Code | Character |
|------|-----------|------|-----------|------|-----------|------|-----------|------|-----------|
| 00 | 0 | 09 | 9 | 18 | I | 27 | R | 36 | SP |
| 01 | 1 | 10 | A | 19 | J | 28 | S | 37 | $ |
| 02 | 2 | 11 | B | 20 | K | 29 | T | 38 | % |
| 03 | 3 | 12 | C | 21 | L | 30 | U | 39 | * |
| 04 | 4 | 13 | D | 22 | M | 31 | V | 40 | ÷ |
| 05 | 5 | 14 | E | 23 | N | 32 | W | 41 | – |
| 06 | 6 | 15 | F | 24 | O | 33 | X | 42 | . |
| 07 | 7 | 16 | G | 25 | P | 34 | Y | 43 | / |
| 08 | 8 | 17 | H | 26 | Q | 35 | Z | 44 | : |

COLOR HOLOGRAPHIC QUICK RESPONSE (CHQR) CODE FOR COUNTERFEIT AVOIDANCE

This application claims the benefit of U.S. Provisional Application No. 62/645,318 filed Mar. 20, 2018 and U.S. Provisional Application No. 62/740,590 filed Oct. 3, 2018, which are hereby incorporated by reference in their entirety as if fully set forth herein.

This invention was made with Government support under Contract Proposal L163-003-0042 to the U.S. Defense Logistics Agency. The Government has certain rights in this invention.

BACKGROUND OF THE INVENTION

An effective counterfeit part prevention and avoidance plan has several levels of processes.

An example of a risk-based approach below is employed by one manufacturer of electronics. First, maximize availability of authentic parts by procuring them from reliable sources. When it is not possible to buy from original component manufacturers (OCM) and franchised distributors, develop risk assessment plans for material procured from non-franchised distributors. Ensure adequate testing from approved test houses on material procured from non-franchised distributors to determine suspect part status based on criticality of device, application, and supplier. Improve receiving and inspection requirements of non-franchised procured parts to prevent counterfeit parts from entering the supply chain.

But, what method of counterfeit prevention should one use? An expert company in this area, Selectamark Security Systems plc, reports:

The method of stamping or engraving a postcode can weaken a material such as metal or a plastic. Printed or painted fluorescent markings that require an ultraviolet light source to read, wear away with time or can be deliberately removed. Stencils for indelible markings have proven very successful, and Selectamark issues about 4 million stencils a year. Radio frequency identification (RFID) is in use to monitor and read secret electronic chips in caravans, boats, motor vehicles, cargo containers and other applications where tracking, identifying and recovering a valuable item is important. Smart water is another method that applies a chemical with a forensic signature that can be used to identify the registered owner of the property. A new DNA system evolved from the smart water approach.

SelectaDNA is specially formulated by a system based on Cyphermark which utilizes four distinct chemicals (known by shorthand as A, T, C and G). These four chemicals have two key sequences, whose identity must be known before the unique code sequence can be accessed. The order of these four chemicals in the DNA molecule provides the uniqueness to the DNA string, just as human DNA indicates our own identity.

As an example of technology created to meet Defense Logistics Agency (DLA) needs, there is DNA marking by Applied DNA Sciences (ADNAS). Referencing "Frequently Asked Questions for DNA Marking, Mar. 26, 2014" located at LA.Land.and.Maritime.DNA.Feedback@dla.mil, reports DNA marking is not the single cure for the counterfeit problem. The initial DNA marking R&D project successfully marked approximately 14,000 parts at a domestic original component manufacturer (OCM). The second project marked more than 350,000 at a major offshore fabrication facility. To verify performance of the technology as a marking that could not be changed without detection DLA engaged one of the world's largest non-profit research and development organizations to attempt to defeat the technology. According to Steve Scheiber, The Counterfeit Report, "DNA Sciences participated in a red team challenge," engaging research and development company Battelle to attempt to defeat or mimic the DNA mark. The company provided Battelle with information about the technology, then gave it a year to prepare by reviewing the patent application and other relevant literature. Applied DNA then supplied Battelle with 500 marked parts. The company attempted to defeat the marks on a percentage of those devices, then returned the entire lot for verification.

Applied DNA correctly identified all marks that had been altered and all those that had not." To date, those chemical and mechanical defeat efforts have not been successful. DLA has also forensically authenticated 100% of DNA collection swabs submitted during a trial implementation. These results and others like it have provided DLA a basis for moving forward with implementation.

In a Sep. 11, 2014 DLA Land and Maritime Memorandum to Industry on DNA marking, Rear Admiral King, USN Commander, had this to say: "with our Deoxyribonucleic Acid (DNA) Marking Program reaching its second year, DLA is pleased to announce that DNA marking will continue to be an integral part of DLA's comprehensive program to deter and detect counterfeit microcircuits in Federal Supply Class (FSC) 5962. DLA is also pleased to report that on 15 Dec. 2014, DLA will no longer issue solicitations requiring suppliers to provide DNA marked FSC 5962 microcircuits. Instead, DLA's Electronics Test Laboratory in Columbus, Ohio will DNA mark all FSC 5962 microcircuits. Indeed, the DNA marking system is very impressive, as is ADNAS prowess for penetrating the anti-counterfeiting marketplace.

Regardless of whether it can or has been defeated by some unadvertised technique, the statement "DNA marking is not the single cure for the counterfeit problem" stands out. An article in the December 2013 issue of Military Embedded Systems had this to say: "Aftermarket suppliers Lansdale Semiconductor in Tempe, Ariz., and Rochester Electronics in Newburyport, Mass., claim that the DNA process doesn't really stop counterfeits, just marks the component as being non-counterfeit—something Original Component Manufacturers (OCMs) already do." The Counterfeit Report adds "the DNA mark does not guarantee a device's authenticity, only its origin and provenance. The initial mark unambiguously identifies the OCM. A distributor that may handle parts from many manufacturers can add a second DNA mark that uniquely identifies that distributor, regardless of which OCM supplied the parts."

Risk-based counterfeit part prevention and avoidance plans would be greatly facilitated by a technology that could travel with the materiel from the OCM to the DLA's supply centers, authorized dealers, and even to individual warfighters that are deployed. This technology should identify packages that have been tampered with and should be readily coded such as DNA and microdot materials. The DLA is exploring DNA marking, along with other technologies as a possible solution to mitigate counterfeits in these high-risk items: FSC 3110, Bearings (Aviation); FSC 4730, Fittings, Hoses and Tube (L&M); FSC 5325, Fasteners (Troop Support);

Needs exist for improved counterfeit avoiding identifications.

SUMMARY OF THE INVENTION

This invention provides tamper proof, tamper resistant, multi-layer Color Holographic Quick Response (CHQR) code, holographic imagery, anti-counterfeit, holograms, package labeling.

HNu Photonics completed work on their 3D barcode in support of the cooperative Japan-U.S. Smart Grid Project study which showcased both smart grid technologies and electric vehicles. The HNu 3D barcode called FLASHCode is a Red-Green Blue Quick Response code (RGB QR) created for use as a new form of secure payment card that can store personal information. The technology is seen as a more secure means of securing financial transactions such as Point of Sale (POS) payments as compared with a credit card having a magnetic strip that can be read, copied or erased. HNu installed a network of commercial Electric Vehicle Fast Charging stations that charge an electric vehicle (EV) over the course of about 20 minutes while the driver and passengers shop, or have a coffee, or check their email. The FLASHCode allows the car owners to be able to purchase electricity for their EV securely. HNu also designed the software and printed the RGB cards for the charging stations.

The FLASHCode is a tri-color barcode that can be extended to a larger number of colors 8 or 16, etc., for which the term spectrum barcode is applicable and descriptive. Each color represents an additional bit plane of information which is decoded via HNu's proprietary multidimensional scanner technology. 3-colors or RGB represents 3 bits of data for every spatial pixel in a QR code, therefore we refer to it as a 3D Barcode or 3D QR code. The Japan-US Smart Grid Initiative was jointly funded by the U.S. Department of Energy (DOE) and Japan's New Energy and Industrial Technology Development Organization (NEDO). However, HNu Photonics chose to perform the development as a company IR&D program in order to retain the proprietary intellectual property. Further development in this IR&D program by Dr. James F. Scholl has perfected multi- and hyperspectral imaging techniques with dispersive holographic imaging technology using multiple sources of narrowband light.

Applicant, HNu Photonics, plans to productize and sell as well as to license the Color Holographic Quick Response (CHQR) product to Lockheed, other system prime contractors, and other companies in the anti-tampering and counterfeit prevention marketplace. Referencing Visiongain, the 2016 global anti-counterfeit packaging market will generate revenues of $18.14 billion. Referencing the Future of Anti-Counterfeiting, Brand Protection and Security Packaging to 2020, a new market report from Smithers Pira, the forecast for the global market for anti-counterfeiting, brand protection and security packaging technology will grow during the period 2015-20 at a compound annual growth rate (CAGR) of 9.3% to $4.2 billion. MarketsandMarkets projects that the anti-counterfeit packaging market size will grow from $82.05 billion to $153.95 billion by 2020, at an estimated CAGR (cumulative annual growth rate) of 13.41%. Regardless of the forecasting agency, it is very clear that the anti-counterfeit packaging marketplace is huge. Just for the DLA alone, the presently established Federal Supply Code (FSC), consists of 78 groups, which are subdivided into 645 classes, and more than 6.4 million items to be tracked. When we consider pharmaceuticals, consumer electronics, food, tobacco, and hundreds of other categories, the need for CHQR is readily obvious.

Color Holographic Quick Response (CHQR) technology combines RGB 3-layer quick response (QR) codes with holographic imaging technology that creates features that would be extremely difficult for counterfeiters to replicate. CHQR is not QR codes with holograms in parallel; instead, CHQR makes a multidimensional QR code the hologram itself. We use the mathematics of holography to encrypt a code that cannot be copied.

Counterfeiting of microelectronics is of great concern to industry and government because a system malfunction can present situations that cause mission failures, health and safety concerns and jeopardize national security. They also have a negative impact on brand reputation, and R/D efforts. Furthermore, counterfeits pose a reduction in reliability and channel substantial resources to criminal networks, organized crime and the illicit marketplace.

CHQR is a major enhancement of existing multicolor QR codes in that holography is explicitly incorporated into the design. To reiterate part (a), CQHR is not QR code with holograms in parallel; it is a hologram with anti-tamper and anti-counterfeiting capabilities incorporated in its design.

CHQR incorporates QR codes consisting of matrices of information coded as two-dimensional B/W patterns arranged in three narrowband layers in RGB. The encoded layers of QR codes is converted into a hologram. This hologram enables features that are difficult to replicate by counterfeiters, such as the use of codebooks to encrypt the code in each layer. These codebooks can be adapted for different applications or products; it is possible to develop these codebooks to also enable anti-tampering capabilities.

Additional embodiments of the CHQR innovation is described in the following continuation in part:

CHQR 2.0 Instead of 3 color planes (B, G, R) in CHQR we can take advantage of the 8-bit data storage architecture used for example in (standard) JPEG image data files. Color images in JPEG are 8 bit in each of the B, G, and R producing a total of 24 bits. A generalization of CHQR can be applied to encoding information in each of those bit-planes such that we can store 24 layers of information. The CHQR code becomes a continuous color coded data image with additional capability of storing an 8-layer B/W image within each band. For 16-bit images we can store vast amount of data within a single CHQR color coded label.

A new label has an identifying code that includes a color holographic quick response code combining red, green and blue multiple superimposed layers of quick response codes. Holographic imaging technology creates features that are extremely difficult to replicate, thereby providing a multi-dimensional quick response code of a hologram that cannot be copied.

The color holographic quick response code is embedded in labels configured for affixing to manufactured objects. Each of the multiple layers has a distinct color. Black and white components may be used in one or more of the multiple layers. Each of the layers has more than one color in one embodiment.

The multiple superimposed layers have superimposed information that is decomposed using an imaging system with one or more dispersive holograms. Each layer comprises a 2-D arrangement of code.

In one embodiment at least one hologram has a lenticular-type arrangement and information images change with changing viewing angles.

The multiple layers are coded with wavelengths between ultra violet and infra-red. Crucial information is spread over multiple layers.

The process provides a label having an identifying code by providing in the identifying code a color holographic quick response code by combining red, green and blue multiple superimposed layers of quick response codes using holographic imaging technology and creating features that are extremely difficult to replicate. The invention provides a multidimensional quick response code of a hologram that cannot be copied.

The code is embedded in labels configured for affixing to manufactured objects. Each of the multiple layers has a distinct color.

Black and white components are provided in one or more of the multiple layers. Each of the layers may be provided with more than one color.

The process provides the multiple superimposed layers with superimposed information that is decomposed using an imaging system with one or more dispersive holograms.

Each layer is provided with a 2-D arrangement of code.

The method further provides at least one hologram with a lenticular-type arrangement, wherein information images change with changing viewing angles.

Providing the multiple layers uses color codes having wavelengths between ultra violet and infra-red.

The process uniquely spreads crucial information over the multiple layers.

The new system codes labels with identifying codes. Each label has an identifying code that includes a color holographic quick response code combining red, green and blue multiple superimposed layers with quick response codes, using holographic imaging technology. The created features are extremely difficult to replicate. A multidimensional quick response code is a hologram providing a code that cannot be copied.

These and further and other objects and features of the invention are apparent in the disclosure, which includes the above and ongoing written specification, with the claims and the drawings.

BRIEF DESCRIPTION OF THE DRAWINGS

FIG. 2 (Right) shows an image of the 3-layer QR code obtained with an imaging system using a dispersive hologram; all three layers are separated cleanly.

FIG. 4 (b) shows a label consisting of an image plane hologram; FIG. 4 (c) shows the label reconstructed with a reading device designed to read the hologram.

DETAILED DESCRIPTION

The term Hologram refers to diffractive devices such as rainbow holograms, 2D or 3D holograms, dot-matrix holograms, holographic stereograms, diffraction gratings, Excelgrams, Pixelgrams, and Kinegrams. For more than several years now various companies have been combining QR codes or bar codes with holograms, but these are in parallel, rather than layered like CHQR. A recent screenshot for Hologram QR codes on the Alibaba website shows examples of the parallel approach, FIG. 1. Customized "stickers" can be purchased from China at the cost of $0.01 or more in bulk, certainly an affordable approach. Noteworthy, China is also the home of some of the best counterfeiters.

Figure 1:
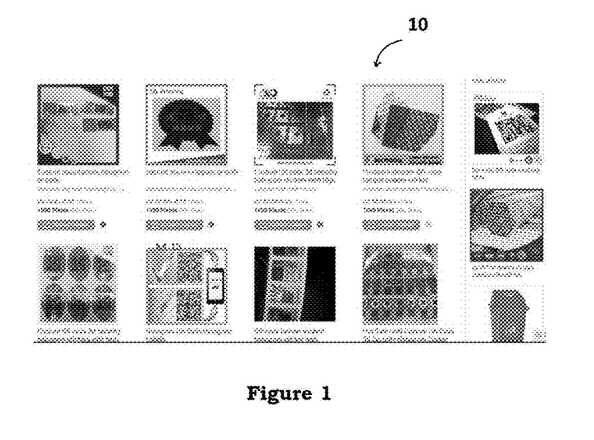
FIG. 1 shows Examples of QR codes with Holograms which is different than Color Holographic QR codes.

FIG. 1 shows Examples 1 of QR codes with Holograms which is different than Color Holographic QR codes.

Figure 2:
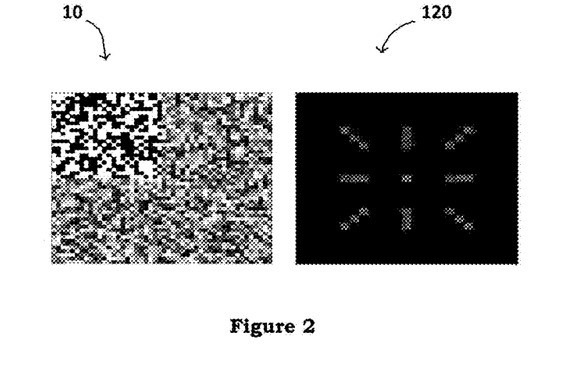
FIG. 2 (Left) shows a 48×48 3-layer QR code superimposing three layers of information.
Figure 3:
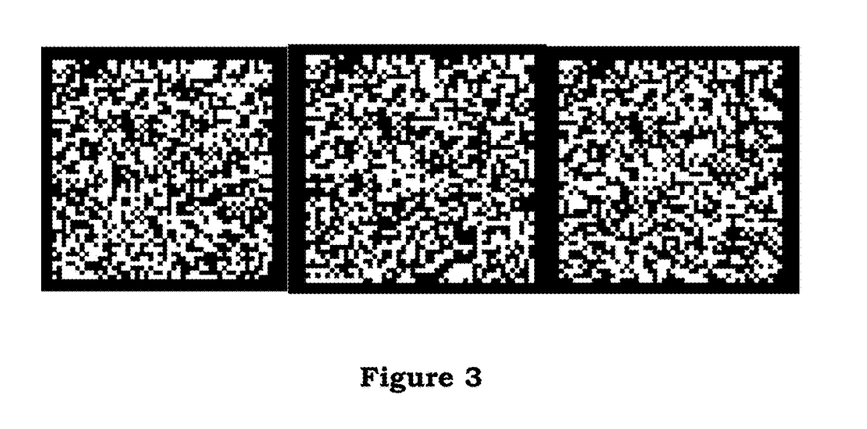
FIG. 3 shows recovered R, G and B layers from the QR code in FIG. 2b.

To illustrate our approach, we arbitrarily create a QR code, which could be as simple as a black and white (B/W) array of squares, or alternatively as sophisticated as a layer of three QR codes, in red, green and blue (RGB). The left side of FIG. 2 shows an example 10 of a 48×48×3-layer deep QR code with both B/W and RGB components. Each of the 3-layers could potentially have information. The superposed information is decomposed using an imaging system with a dispersive hologram. The right side 20 of FIG. 2 shows that the holographic system cleanly separates the 3-layers of information. Here each label 20 consists of a 2D array of squares 21, 23, 25 such as shown in FIG. 3. This is a composite of narrowband R, G and B bit planes. Each plane is 8-bit, with square values 0 (dark) or 255 (light). That is, each pixel has the value $(R_{ij}, G_{ij}, B_{ij})$ where each coordinate is either 0 or 255. Recovery of each layer of information is directly performed using an imager with a dispersive holographic optical element by which each R, G, B layer is read cleanly. Each layer is recovered completely as shown in FIG. 3.

Figure 4:
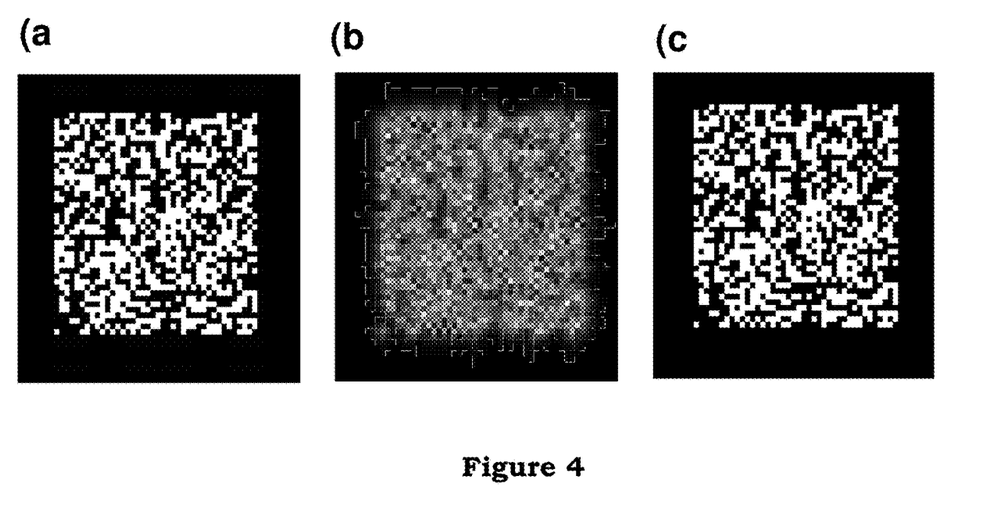
FIG. 4 (a) shows a B/W QR code.

Another alternate holographic system 40 to use is image plane holography as illustrated in FIG. 4. The encoded QR bit array 41 (FIG. 4a) is converted into a label using an image plane hologram 43 (FIG. 4b). To read the QR code's contents a device which could be an inexpensive molded Fresnel type flat lens or added to a standard QR reader scans the label and recovers the input information 45 (FIG. 4c). Although this example uses a single layer of information, multilayer image plane holography is possible. Lenticular type holograms are also used by which images change with viewing angles.

FIG. 2 (Left) shows a 48×48 3-layer QR code 21 superimposing three layers of information. FIG. 2 (Right) shows an image of the 3-layer QR code obtained with an imaging system using a dispersive hologram; all three layers are separated cleanly.

FIG. 3 shows recovered R 31, G 32 and B 33 layers 30 from the QR code in FIG. 2b.

FIG. 4 (a) shows a B/W QR code; FIG. 4 (b) shows a label consisting of an image plane hologram; FIG. 4 (c) shows the label reconstructed with a reading device designed to read the hologram.

Figure 5:
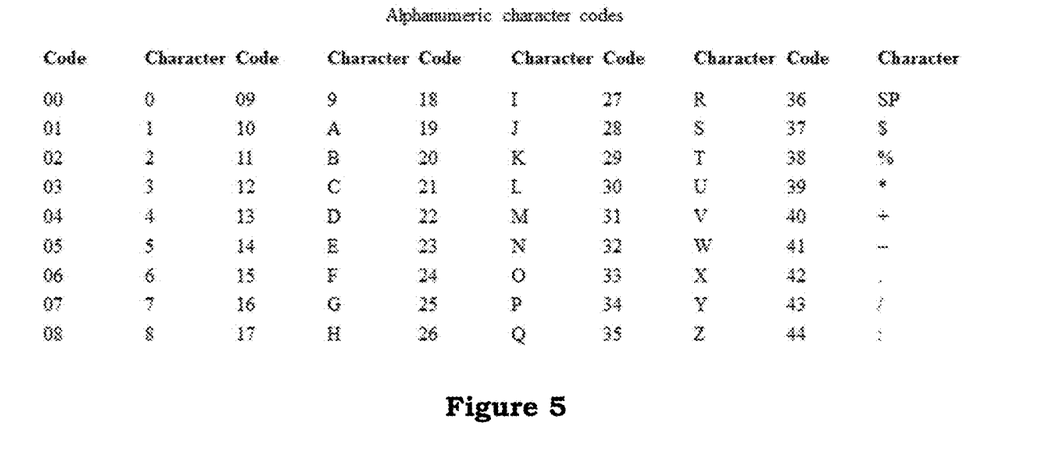
FIG. 5 shows a typical, readily tailorable to requirements, alphanumeric codebook.

A key point for the reviewer to retain is that we are using the mathematics of holography to encrypt a code that can't be copied. The bit-pattern for each layer is developed using a codebook as shown in FIG. 5. A character is coded as a sequence of six bits (in our coding scheme six b/w squares in each layer). Such a codebook can be adapted for different applications or products; it is possible to develop codebooks and encoding schemes that make it harder to counterfeit and/or enable anti-tampering capabilities.

FIG. 5 shows a typical, readily tailorable to requirements, alphanumeric codebook 50.

The character table 51 in FIG. 5 codes a series of cells in each layer as illustrated 60 in FIG. 6 for the labeling two species 61, 63 of fish found in Hawaii.

Figure 6A:
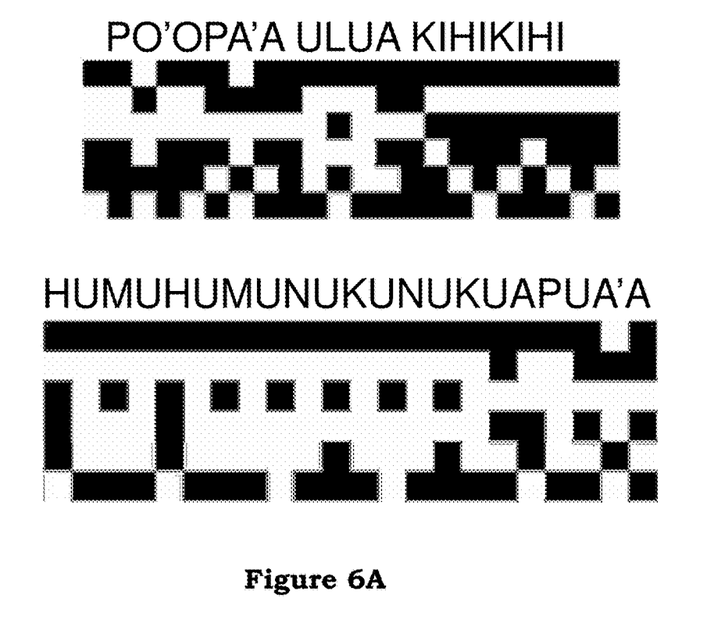
FIG. 6A shows two examples of bit-coding of words from the table in FIG. 5. The bits can be arranged to form information stored in single layer B/W or colored QR codes.

FIG. 6A shows two examples 61, 63 of bit-coding of words from the table 51 in FIG. 5. The bits can be arranged to form information stored in single layer B/W or colored QR codes.

The principle behind CHQR is this: a multicolored (i.e. multilayered) QR code enables an efficient way to encode an enormous amount of data about the product as well as other supplier information over wavelength ranges ranging from UV through IR. Each supplier inserts various pieces of information in each QR code layer, with the option of spreading crucial information over a number of separate layers to make this system more tamper-resistant. Such information includes product information, date of manufacture etc. Standard one dimensional barcodes can also be hidden inside the multilayer code.

Furthermore, digital watermarking capability can be added if desired. A good design of a CHQR code enables a measure of digital intricacy analogous to the intricacy of the engraved designs of paper currency. An illustration for the encoding of information with CHQR is shown in FIG. 7.

Figure 6B:
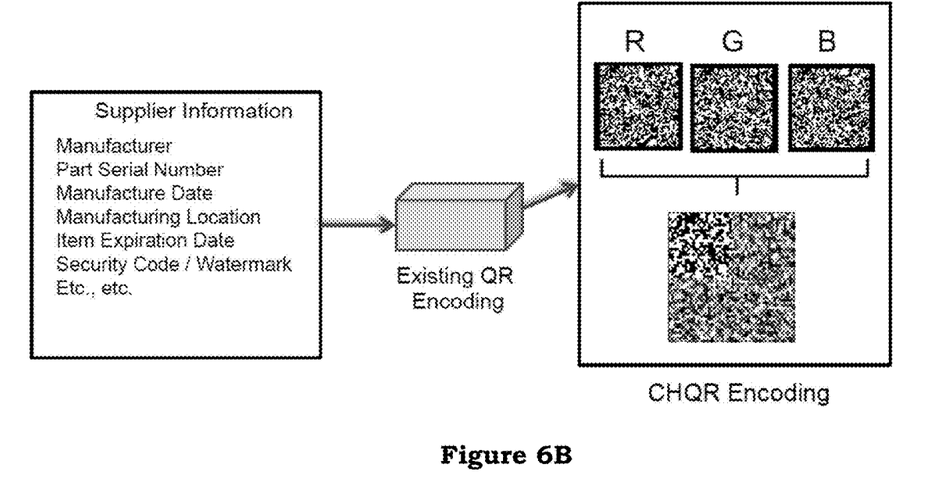
FIG. 6B shows CHQR is able to encode an enormous amount of information and features.

FIG. 6B shows CHQR is able to encode 60 an enormous amount 62 of information and features with the QR coding 64 in R, G, B 66 to produce CHQR encoding 68.

Figure 7:
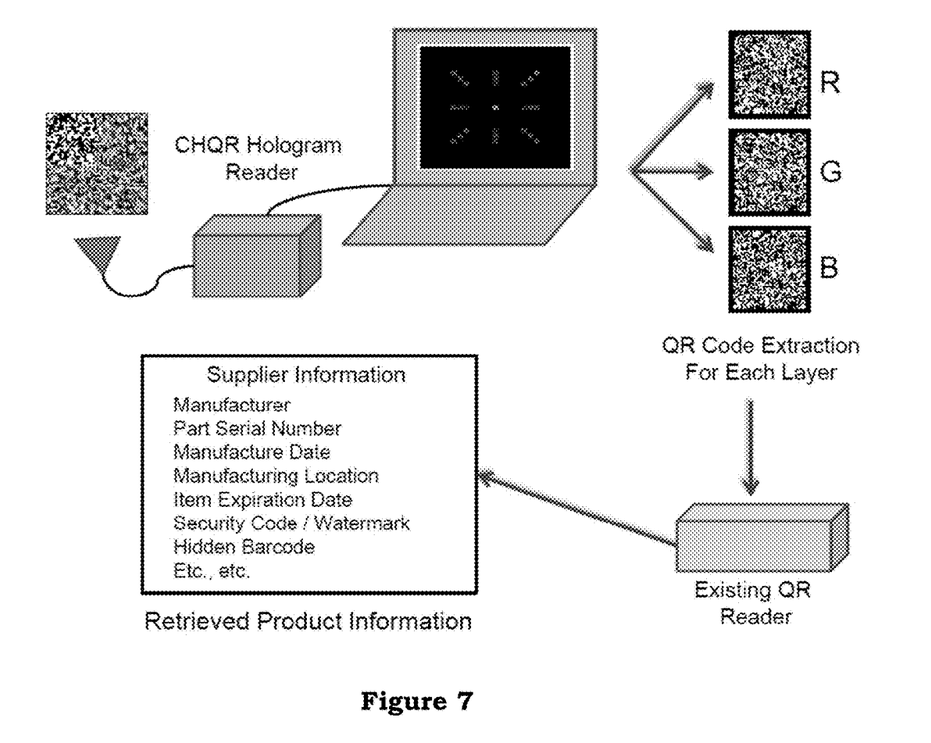
FIG. 7 shows decoding with CHQR proves the multi-layered defensive capability against tampering.

FIG. 7 shows decoding 70 with CHQR proves the multi-layered defensive capability against tampering.

The overall process for decoding 70 with CHQR is illustrated in FIG. 7. CHQR readers 71 have the form factor of several inches on a side. In software with a programmed processor 73, all the R, G, B QR layers 66, and any hidden barcode(s) therein, are extracted separately for decoding by existing QR and barcode readers 75. This system does not require new technology for the final extraction of the information 77.

In general, this can be extended for wavelengths other than RGB. For example, readers for CHQR can use one or more dispersive holographic elements. Each dispersive element is a computer-generated hologram (CGH) that operates at a given waveband. That is, one CGH disperser can be used for UV, another for visible, and another for IR etc. and generates images similar to FIG. 7.

An extension of this innovation is to increase the number of layers from 3 (RGB) to 32, 64 or more; these extensions will greatly enhance anti-tamper capability. Algorithms now being developed at HNu via internal IR&D will enable this phenomenal anti-counterfeiting and anti-tampering capability. This is the idea behind the CHQR 2.0 label which adds layer information within each color through bit-planes. The CHQR 2.0 label can also be "written to" and displayed on any compatible device, computer monitor, smartphone, or any handheld device, or any active of interactive display screen. The result is a powerful re-writable CHQR label where product data can be added to the label at each point of processing along a supply chain creating a complete ledger of the history of a product from raw material to a finished delivered product.

For each R, G, or B layer instead of a standard single color B/W QR code, we have a more continuous encoded data image spanning all color bit planes.

In CHQR 2.0 existing or novel digital watermarking or steganographic algorithms can be incorporated without affecting the data being stored.

The CHQR 2.0 introduces new art to the CHQR color holographic coded label where the CHQR label can be used as a data storage device for secure personal information storage such as but not limited to;

Personal Medical records

Bank and credit card records

Travel records such as driver licenses, passport, itinerary, etc.

Purchasing Records, Recording Point of Sale Transactions.

Etc.

While the invention has been described with reference to specific embodiments, modifications and variations of the invention may be constructed without departing from the scope of the invention, which is defined in the following claims.

We claim:

1. Apparatus comprising a label having an identifying code, further comprising a Color Holographic Quick Response code combining red, green and blue (RGB) multiple superimposed layers quick response (QR) codes using holographic imaging technology and creating features that are extremely difficult to replicate, thereby providing a multidimensional QR code of a hologram itself that cannot be copied, wherein each of the multiple layers has a distinct color, and wherein the apparatus further comprises black and white components in one or more of the multiple layers.

2. The apparatus of claim 1 embedded in labels configured for affixing to manufactured objects.

3. The apparatus of claim 1, wherein each of the layers has more than one color.

4. The apparatus of claim 1, wherein the multiple superimposed layers have superimposed information that is decomposed using an imaging system with one or more dispersive holograms.

5. The apparatus of claim 1, wherein each layer comprises a 2-D arrangement of code.

6. The apparatus of claim 1, wherein at least one hologram has a lenticular-type arrangement, and wherein information images change with changing viewing angles.

7. The apparatus of claim 1, wherein the multiple layers are coded with wavelengths between UV and IR.

8. The apparatus of claim 1, wherein crucial information is spread over multiple layers.

9. A method comprising providing a label having an identifying code, providing in the identifying code a Color Holographic Quick Response code by combining red, green and blue (RGB) multiple superimposed layers of quick response (QR) codes using holographic imaging technology and creating features that are extremely difficult to replicate, thereby providing a multidimensional QR code of a hologram that cannot be copied, further comprising providing each of the multiple layers with a distinct color, and further comprising providing black and white components in one or more of the multiple layers.

10. The method of claim 9, further comprising embedding the code in labels configured for affixing to manufactured objects.

11. The method of claim 9, further comprising providing each of the layers with more than one color.

12. The method of claim 9, further comprising providing the multiple superimposed layers with superimposed information that is decomposed using an imaging system with one or more dispersive holograms.

13. The method of claim 9, further comprising providing each layer comprises a 2-D arrangement of code.

14. The method of claim 9, further comprising providing at least one hologram with a lenticular-type arrangement, wherein information images change with changing viewing angles.

15. The method of claim 9, further comprising providing the multiple layers with code having wavelengths between UV and IR.

16. The method of claim 9, further comprising spreading crucial information over the multiple layers.

17. A system comprising coding labels with identifying codes, each label having an identifying code, wherein the identifying code further comprises a Color Holographic Quick Response code combining red, green and blue (RGB) multiple superimposed layers with quick response (QR) codes using holographic imaging technology, creating features that are extremely difficult to replicate, thereby providing a multidimensional QR code of a hologram that cannot be copied, wherein each of the multiple layers has a distinct color, and wherein the apparatus further comprises black and white components in one or more of the multiple layers.

* * * * *